United States Patent
Majher

(10) Patent No.: US 12,004,502 B2
(45) Date of Patent: Jun. 11, 2024

(54) PEST CONTROL SPRAY

(71) Applicant: The Procter & Gamble Company, Cincinnati, OH (US)

(72) Inventor: Michael Anthony Majher, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 304 days.

(21) Appl. No.: 17/110,566

(22) Filed: Dec. 3, 2020

(65) Prior Publication Data

US 2021/0169061 A1    Jun. 10, 2021

Related U.S. Application Data

(60) Provisional application No. 62/944,379, filed on Dec. 6, 2019.

(51) Int. Cl.

| | | |
|---|---|---|
| *A01M 7/00* | (2006.01) | |
| *A01N 25/06* | (2006.01) | |
| *A01N 27/00* | (2006.01) | |
| *A01N 31/02* | (2006.01) | |
| *A01N 31/08* | (2006.01) | |
| *A01N 31/16* | (2006.01) | |
| *A01N 35/04* | (2006.01) | |
| *A01N 35/10* | (2006.01) | |
| *A01N 37/12* | (2006.01) | |
| *A01N 37/40* | (2006.01) | |
| *A01N 43/16* | (2006.01) | |
| *A01N 43/30* | (2006.01) | |
| *A01N 43/90* | (2006.01) | |
| *A01N 59/14* | (2006.01) | |

(52) U.S. Cl.
CPC ......... *A01M 7/0003* (2013.01); *A01N 25/06* (2013.01); *A01N 27/00* (2013.01); *A01N 31/02* (2013.01); *A01N 31/08* (2013.01); *A01N 31/16* (2013.01); *A01N 35/04* (2013.01); *A01N 35/10* (2013.01); *A01N 37/12* (2013.01); *A01N 37/40* (2013.01); *A01N 43/16* (2013.01); *A01N 43/30* (2013.01); *A01N 43/90* (2013.01); *A01N 59/14* (2013.01); *A01M 2200/011* (2013.01)

(58) Field of Classification Search
CPC ..... A01M 7/0003; A01N 25/06; A01N 27/00; A01N 31/02; A01N 31/08; A01N 31/16; A01N 35/04; A01N 35/10; A01N 37/12; A01N 37/40; A01N 43/16; A01N 43/30; A01N 43/90; A01N 59/14
See application file for complete search history.

(56) References Cited

U.S. PATENT DOCUMENTS

| | | |
|---|---|---|
| 5,227,406 A | 7/1993 | Beldock et al. |
| 5,711,488 A | 1/1998 | Lund |
| 7,621,468 B2 | 11/2009 | Smith et al. |
| 7,886,995 B2 | 2/2011 | Togashi |
| 7,938,342 B2 | 5/2011 | Octeau et al. |
| 8,191,801 B2 | 6/2012 | Khan et al. |
| 8,276,835 B2 | 10/2012 | Lowry et al. |
| 8,333,332 B2 | 12/2012 | Burghaus et al. |
| 8,418,940 B2 | 4/2013 | Songbe et al. |
| 8,844,843 B2 | 9/2014 | Horiuchi et al. |
| 9,040,024 B2 | 5/2015 | Tasz et al. |
| 9,138,409 B2 | 9/2015 | Nguyen et al. |
| 9,242,256 B2 | 1/2016 | Clark et al. |
| 9,393,336 B2 | 7/2016 | Shah et al. |
| 9,527,092 B2 | 12/2016 | Miyamoto et al. |
| 9,554,982 B2 | 1/2017 | Swaile et al. |
| 9,579,265 B2 | 2/2017 | Swaile et al. |
| 9,999,895 B2 | 6/2018 | Nelson et al. |
| 10,427,862 B2 | 10/2019 | Clark et al. |
| 10,717,092 B2 | 7/2020 | Songbe |
| 2001/0011687 A1 | 8/2001 | Benoist |
| 2007/0267522 A1 | 11/2007 | Helie et al. |
| 2009/0020621 A1 | 1/2009 | Clark et al. |
| 2020/0269261 A1 | 8/2020 | Bodet et al. |

FOREIGN PATENT DOCUMENTS

| | | | |
|---|---|---|---|
| WO | 2008011054 A2 | 1/2008 | |
| WO | 2010117740 A2 | 10/2010 | |
| WO | WO-2021050318 A1 * | 3/2021 | ......... B65D 83/0061 |

OTHER PUBLICATIONS

PCT Search Report and Written Opinion for PCT/US2020/063054 dated Mar. 23, 2021.

* cited by examiner

Primary Examiner — Snigdha Maewall
(74) Attorney, Agent, or Firm — Amanda Herman Berghauer

(57) ABSTRACT

The present disclosure relates to arthropod pest control sprays and methods of using such sprays to control arthropod pests.

15 Claims, 8 Drawing Sheets

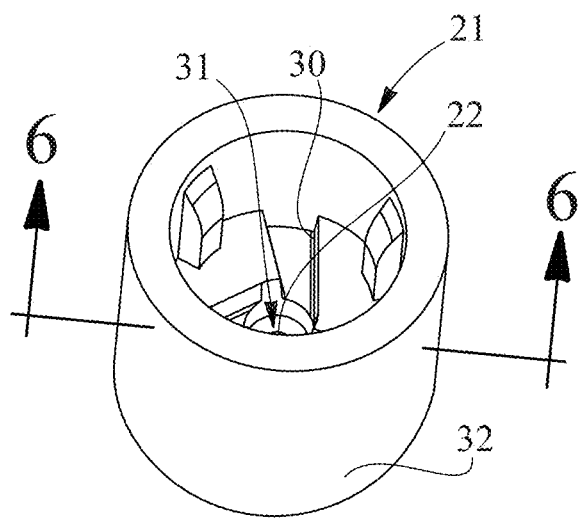
Fig. 2
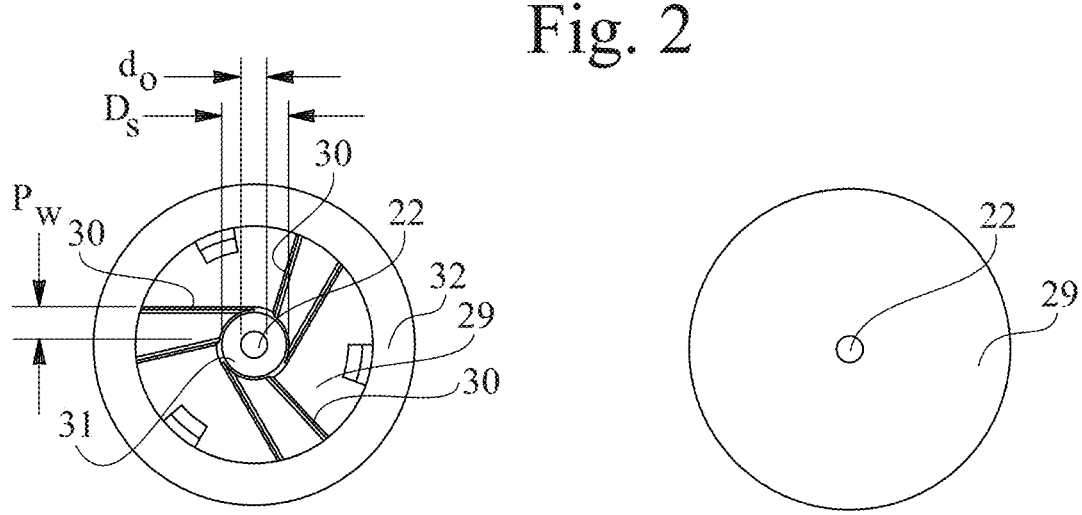
Fig. 3
Fig. 4
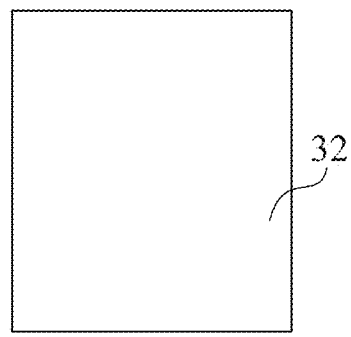
Fig. 5

PEST CONTROL SPRAY

FIELD OF THE INVENTION

The present disclosure relates to arthropod pest control sprays and methods of using such sprays to control pests.

BACKGROUND OF THE INVENTION

The market for arthropod pest control products is growing. An increase in urban housing, a growing consumer awareness concerning health and hygiene, changes in weather patterns, and an increasing demand for eco-friendly arthropod pest control products is contributing to this growth. A number of arthropod pest control products exist today to control various arthropod pests, such as roaches, ants, flies, and gnats, both outside and inside the home. Existing arthropod pest control products have a number of disadvantages, though: some products contain ingredients that consumers may be wary of, some products are messy or difficult to use, and some products have limited efficacy. Furthermore, because many arthropod pests may move quickly and erratically, it is more challenging to apply a pest control product to the arthropods in a targeted manner.

There is a need for an arthropod pest control product that is easy to use and effective to immobilize and/or kill pests. In particular, there is a need for an easy-to-use and effective arthropod pest control aerosol spray. An aerosol spray product that sprays evenly and accurately is easier to use and less messy. The spray pattern of a product depends on both the design of the spray dispenser as well as the formulation, for example, oil-based formulations versus water-based formulations. This disclosure relates to an arthropod pest control aerosol product that comprises a spray dispenser and an oil-based arthropod pest control formulation, where the dispenser is designed to allow for even and accurate application of the spray. The product is easier to target and apply to an arthropod pest, without over-spraying or puddling on nearby surfaces.

SUMMARY OF THE INVENTION

The present disclosure relates to an aerosol arthropod pest control product comprising an aerosol dispenser assembly and an arthropod pest control composition, wherein the aerosol dispenser assembly comprises a reservoir, a valve assembly in fluid communication with the reservoir, an actuator body, and a nozzle insert comprising a swirl chamber in fluid communication with a plurality of inlet ports and an outlet orifice; wherein the arthropod pest control composition comprises from about 5% to about 99% by weight of a carrier oil, from about 0.1% to about 25% by weight of one or more active ingredients, and a propellant; and wherein the aerosol arthropod pest control product has a flow rate of about 1.80 g/s to about 3.00 g/s and a Dv50 value of about 100 µm to about 200 µm.

The present disclosure also relates to an aerosol arthropod pest control product comprising an aerosol dispenser assembly and an arthropod pest control composition, wherein the aerosol dispenser assembly comprises a reservoir, a valve assembly in fluid communication with the reservoir, an actuator body, and a nozzle insert comprising a swirl chamber in fluid communication with a plurality of inlet ports and an outlet orifice; wherein the arthropod pest control composition comprises from about 5% to about 99% by weight of a carrier oil, from about 0.1% to about 25% by weight of one or more active ingredients, and a propellant; and wherein the aerosol arthropod pest control product has a flow rate of about 1.80 g/s to about 3.00 g/s and a Sauter mean diameter of about 85 µm to about 156 µm.

The present disclosure also relates to a method of controlling an arthropod pest comprising: a) providing an aerosol arthropod pest control product comprising an arthropod pest control composition contained within a reservoir of an aerosol dispenser assembly; b) dispensing the arthropod pest control composition from the aerosol dispenser assembly through a nozzle insert comprising a swirl chamber; wherein the arthropod pest control composition comprises from about 5% to about 99% of a carrier oil and from about 0.1% to about 25% of one or more active ingredients; and wherein the aerosol arthropod pest control product has a flow rate of about 1.80 g/s to about 3.00 g/s and a Dv50 value of about 100 µm to about 200 µm.

BRIEF DESCRIPTION OF THE DRAWINGS

FIG. 2 is an isometric view of a nozzle insert according to the disclosure.

FIG. 3 is a bottom plan view of the nozzle insert of FIG. 2;

FIG. 4 is a top plan view of the nozzle insert of FIG. 2;

FIG. 5 is a side view of the nozzle insert of FIG. 2;

DETAILED DESCRIPTION OF THE INVENTION

Aerosol Dispenser Assembly

Figure 1:
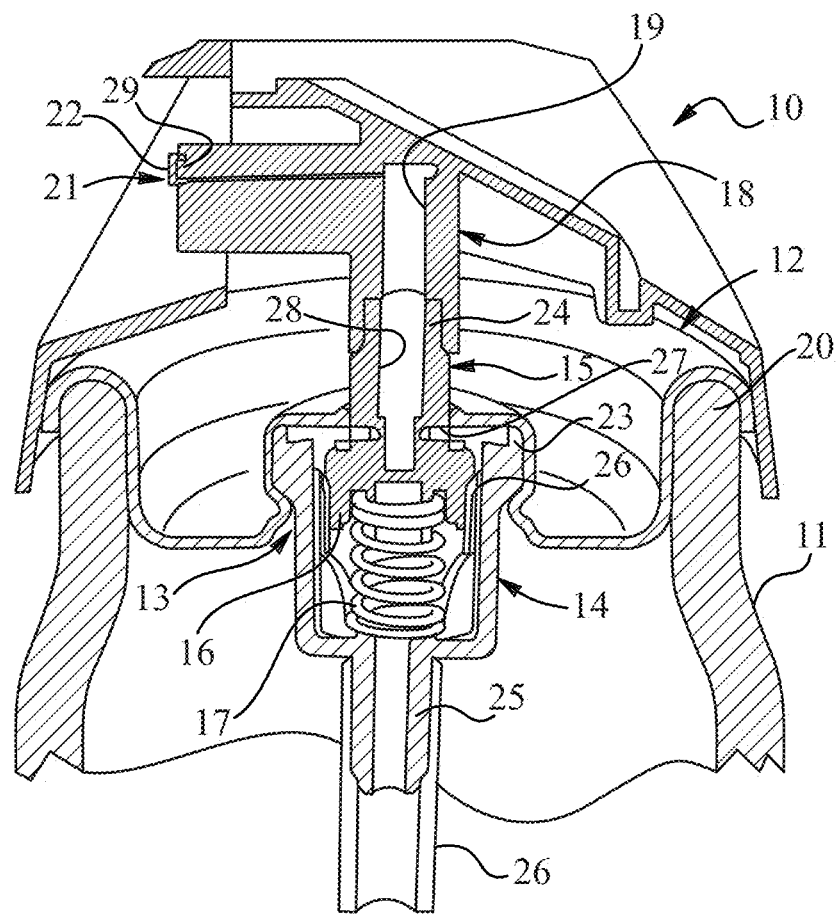
FIG. 1 is a cross-sectional view of an aerosol dispenser assembly having a nozzle insert according to the disclosure.

FIG. 1 depicts an aerosol dispenser assembly 10 that includes a nozzle insert 21 having a swirl chamber (not shown in FIG. 1). The aerosol dispenser assembly 10 includes a container 11 covered by a mounting cup 12. A mounting gasket (not shown) may be disposed between an upper rim 20 of the container 11 and the underside of the mounting cup 12. A valve assembly 13 is used to selectively release the contents from the container 11 to the atmosphere. The valve assembly 13 comprises a valve body 14 and a valve stem 15. The valve stem 15 includes a lower end 16 that extends through a return spring 17. An actuator body 18 is mounted on top of the valve stem 15 and defines a primary passageway 19. The actuator body 18 is also connected to the nozzle insert 21 that defines an exit orifice shown generally at 22.

An upper rim 23 of the valve body 14 is affixed to the underside of the mounting cup 12 by a friction fit and the valve stem 15 extends through the mounting cup 12. The actuator body 18 is frictionally fitted onto the upwardly extending portion 24 of the valve stem 15. The lower end 25 of the valve body 14 is connected to a dip tube 26. Gaskets may or may not be provided between the valve body 14 and the mounting cup 12, and between the valve stem 15 and the mounting cup 12, depending upon the materials used for each component. Suitable materials that will permit a gasket-less construction will be apparent to those skilled in the art. Similarly, gaskets or seals are typically not required between the actuator body 18 and the upwardly extending portion 24 of the valve stem 15. While the aerosol dispenser assembly 10 of FIG. 1 employs a vertical action-type actuator body or cap 18, other actuator cap designs may be used, such as an actuator button with an integral over cap, a trigger actuated assembly, a tilt action-type actuator cap, or other designs.

In operation, when the actuator body 18 is depressed, the valve stem 15 moves downward, thereby allowing pressurized liquid product to be propelled upward through the dip tube 26 and the lower portion 25 of the valve body 14 by a propellant, which may be a compressed gas. From the valve body 14, the product is propelled past the lower end 16 of the valve stem 15 through the channel 26 and through the stem orifice(s) 27, out the passageway 28 of the valve stem and into the primary passageway 19 of the actuator body 18. Two valve stem orifices 27 may be employed, as is shown in FIG. 1. A single valve stem orifice 27 or more than two valve stem orifices 27 may also be used. Multiple valve stem orifices 27 may provide greater flow and superior mixing of the compressed gas product.

It should be noted that while specific features and a configuration for a system for providing a compressed gas product are exemplified in the aerosol dispenser assembly 10, the invention is not limited to such features and configuration. Indeed, as will be appreciated by those skilled in the art, a wide variety of aerosol dispenser assemblies could be used.

FIGS. 2-6 show examples of nozzle inserts 21. Each nozzle insert 21 includes a sidewall 32 that defines a substantially circular shape, and an endwall 29 that includes an outlet orifice 22. The shape of the sidewall may be varied such that the nozzle insert 21 includes, for example, a plurality of sidewalls defining a rectangular shape or any other polygonal shape, with the corresponding slot in the actuator body of the aerosol dispenser assembly that receives the nozzle insert 21 shaped to correspond to the shape of the sidewall 32.

The nozzle insert 21 includes a plurality of inlet ports 30 that lead to a swirl chamber 31. The swirl chamber 31 is in fluid communication with the outlet orifice 22. Thus, the nozzle insert 21 provides a fluid pathway from the inlet ports 30 to the swirl chamber 31, and then out of the nozzle insert 21 through the outlet orifice 22. Thus, a compressed gas product contained in a system including a container and aerosol dispenser assembly, such as those described above, can be dispensed through the fluid pathway in the nozzle insert 21.

The configuration of the swirl chamber 31 and the tangentially positioned inlet ports 30 creates a swirling motion to the liquid in the swirl chamber 31. As a result, a core of air extends from the rear of the swirl chamber 31 to the outlet orifice 22. Thus, the product dispensed from the outlet orifice 22 is released as an annular sheet, which spreads radially outward to form a hollow conical spray. It should be noted that although three inlet ports 30 are shown, the number of inlet ports 30 can be any number, including only a single inlet port. The number of inlet ports 30 will depend on factors such as, for example, the size of the corresponding system, the desired shape of the system.

Figure 6:
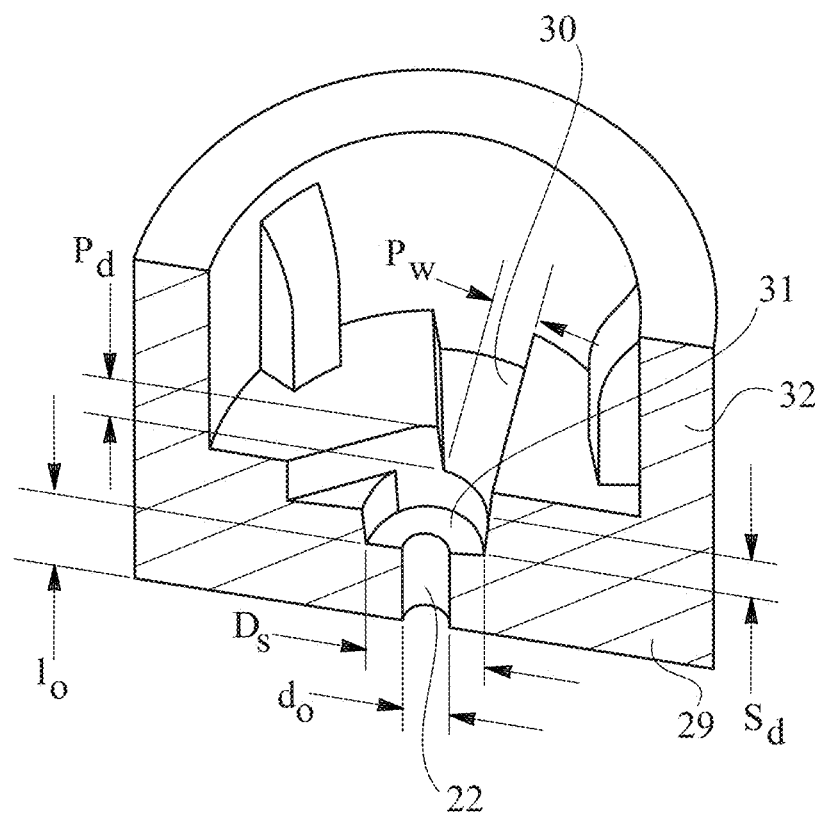
FIG. 6 is a cross-sectional isometric view of the insert of FIG. 2, taken along a line 6-6 in a direction of the arrows of FIG. 2.
Figure 7A:
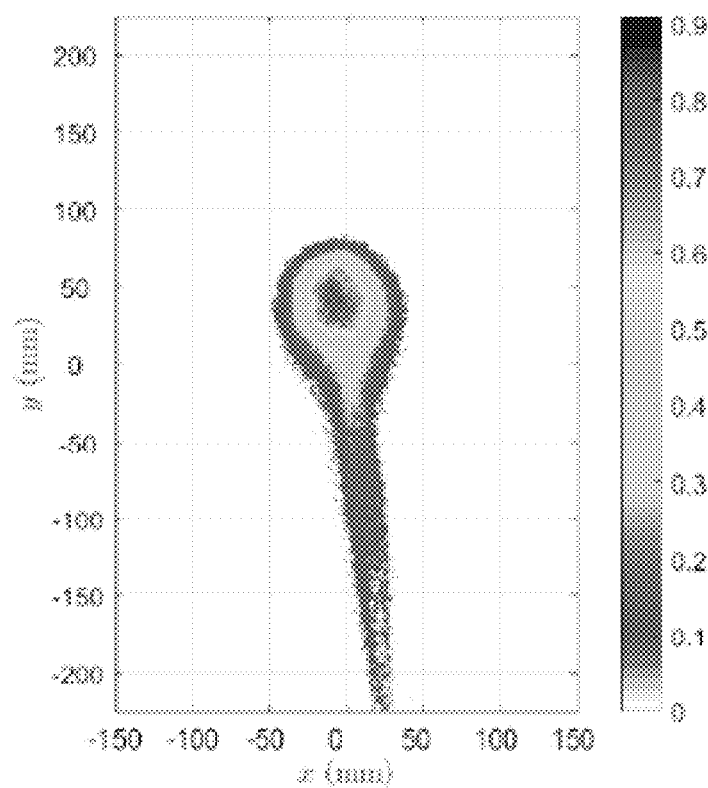
FIGS. 7A-7J are laser sheet images (LSI) showing the spray patterns of several aerosol arthropod pest control products.
Figure 7B:
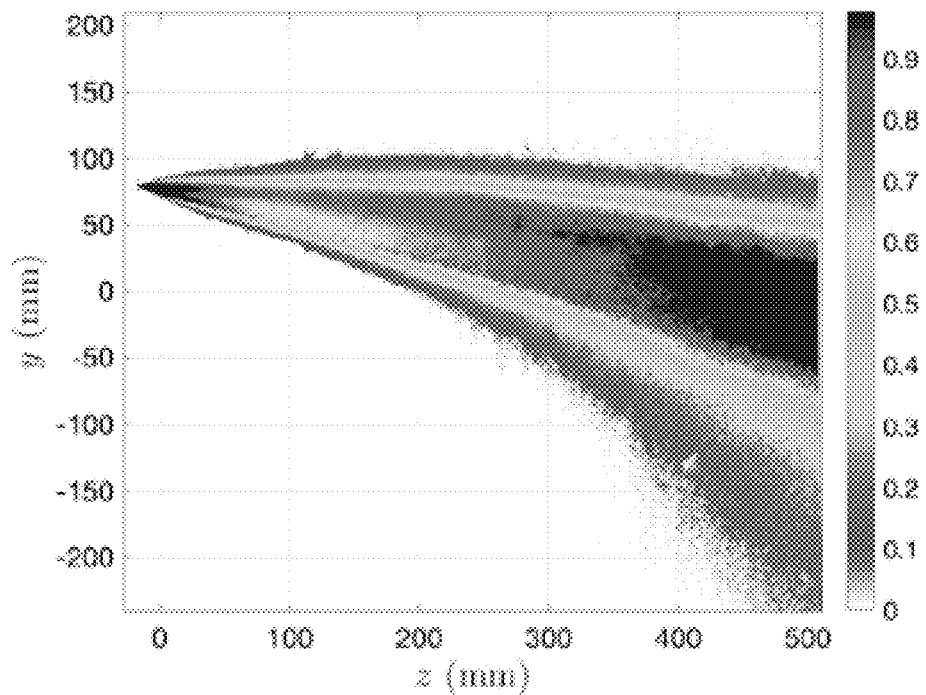
Figure 7C:
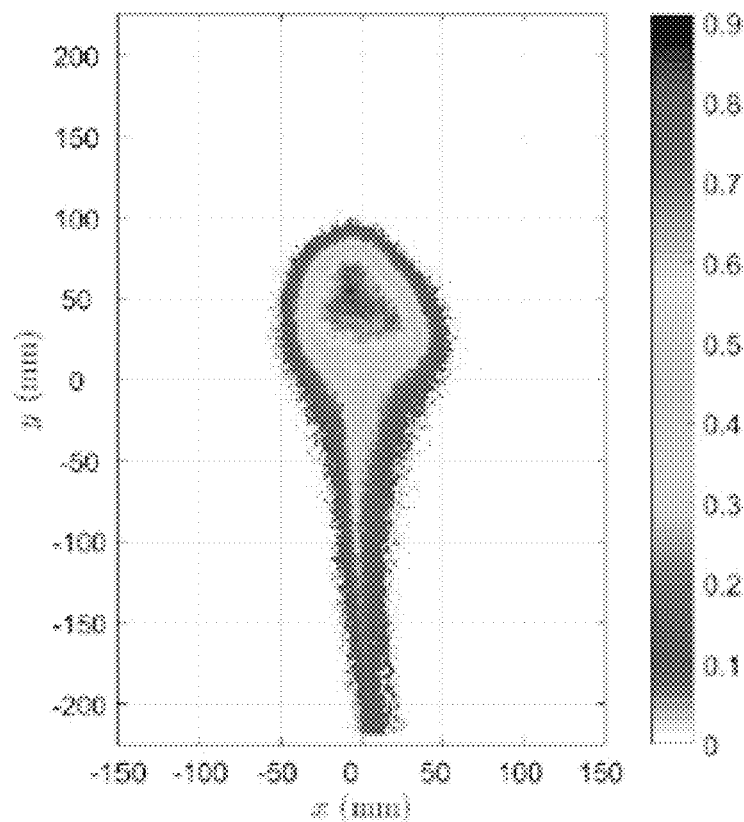
Figure 7D:
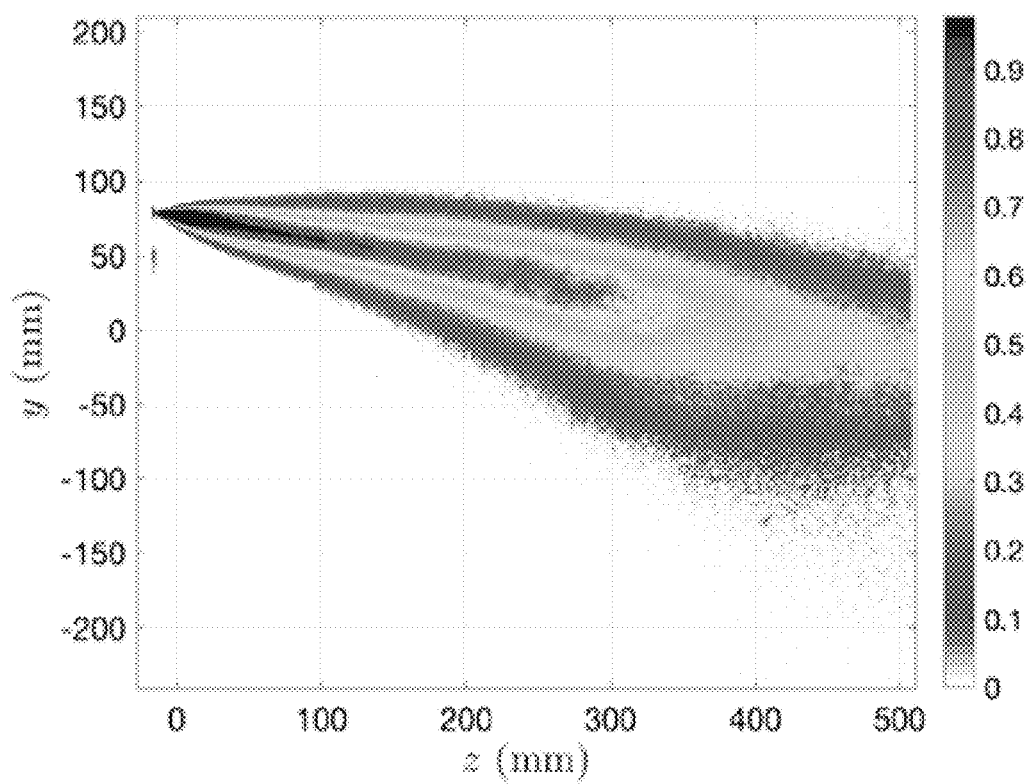
Figure 7E:
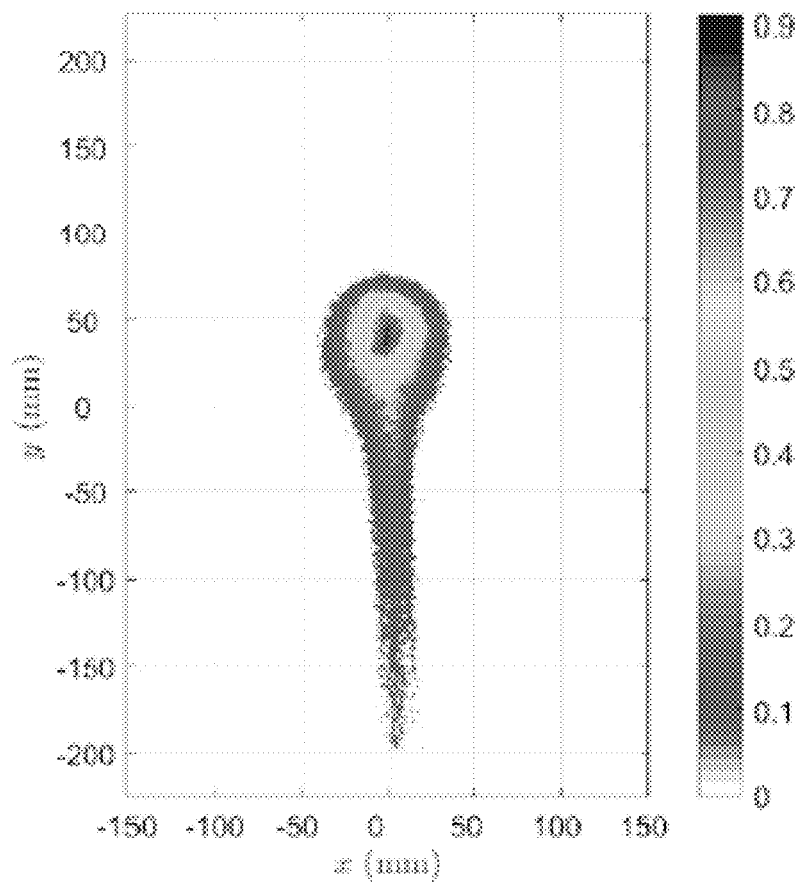
Figure 7F:
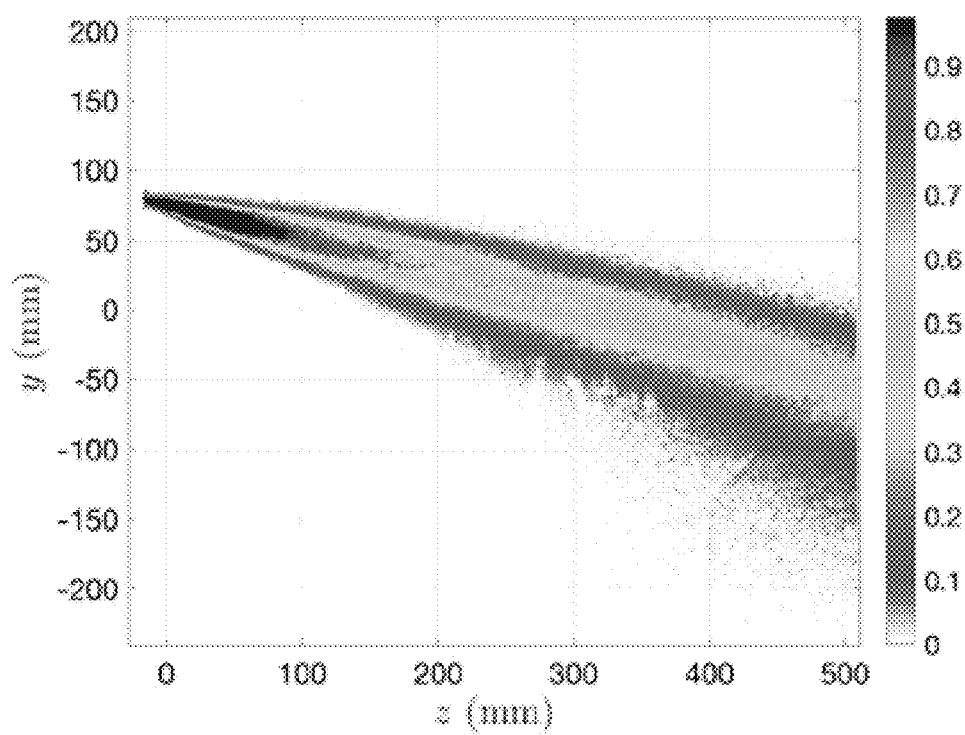
Figure 7G:
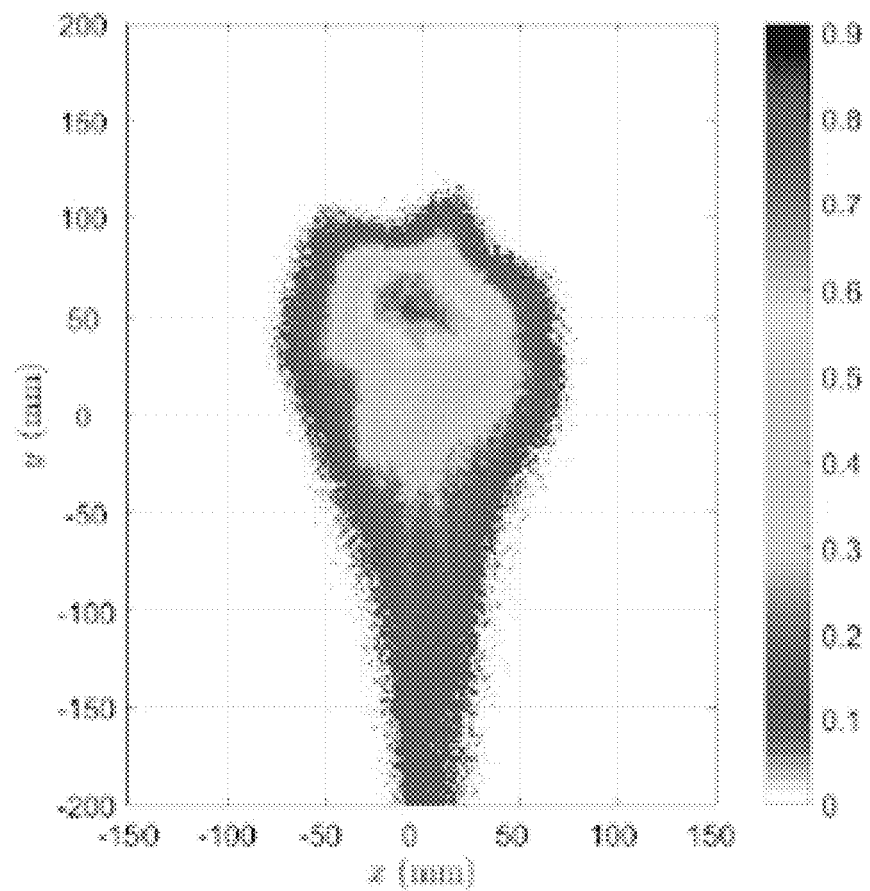
Figure 7H:
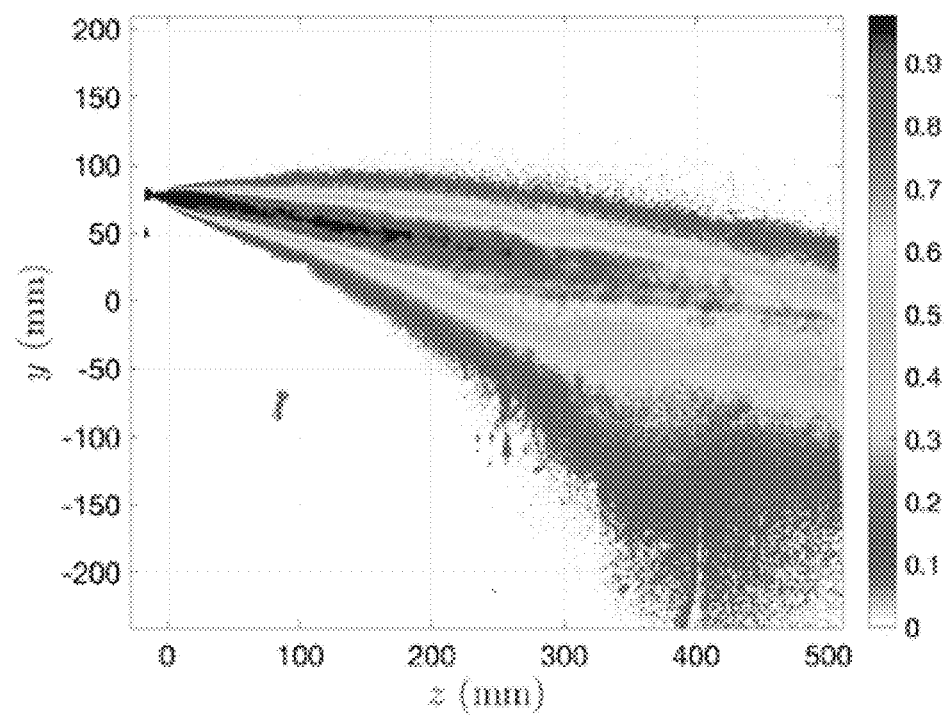
Figure 7I:
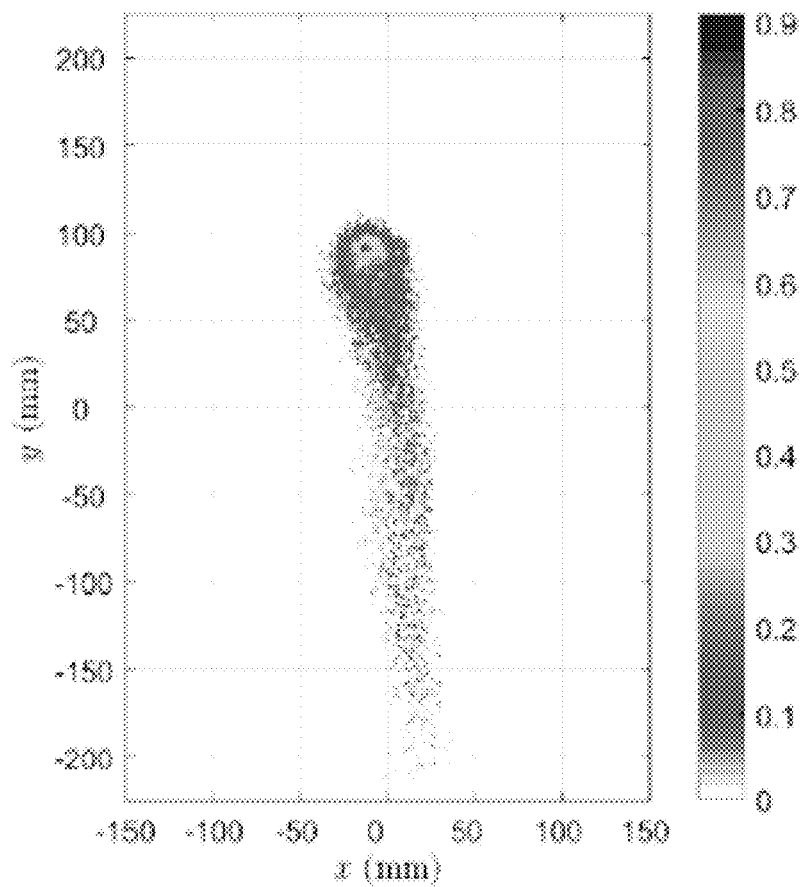
Figure 7J:
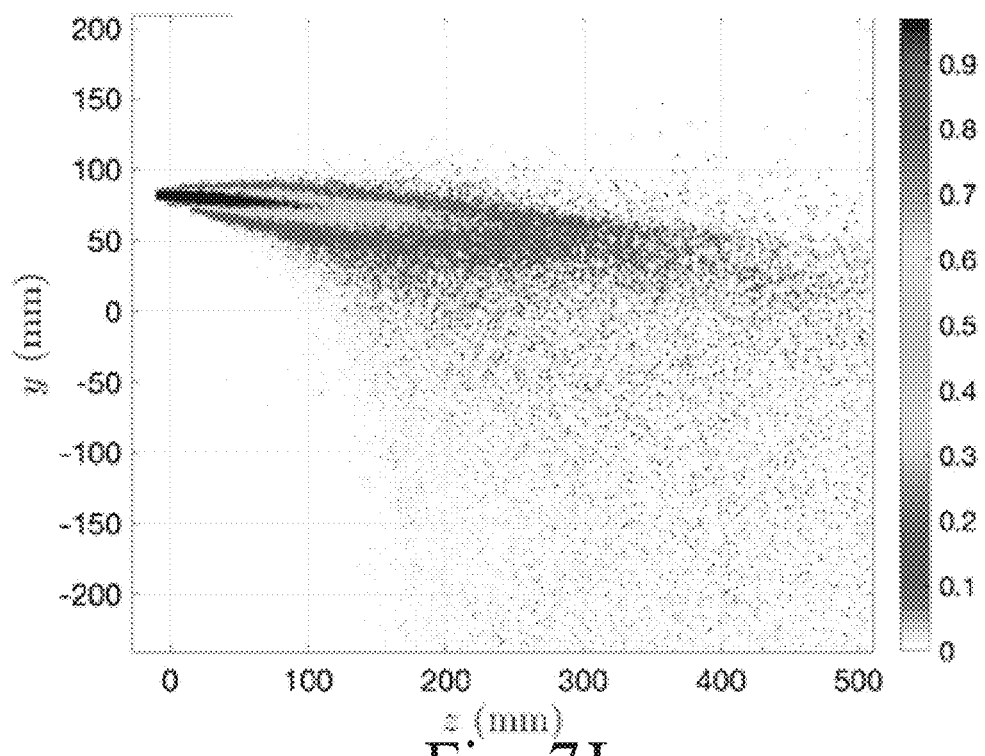

Certain parameters of the nozzle insert 21 are shown in FIGS. 2 and 6. One such parameter is the "diameter" $D_s$ of the swirl chamber 31. As is apparent from FIGS. 3-6, the swirl chamber 31 has a substantially circular shape. The swirl chamber 31, however, may take other shapes, such as a square shape, where the diameter $D_s$ represents the maximum diameter of a circle that can be contained in the swirl chamber 31.

Other parameters of the swirl chamber 31 and outlet orifice 22 are shown in FIGS. 2 and 6. One such parameter is the depth of the swirl chamber $S_d$. As shown in FIG. 6, the depth of the swirl chamber $S_d$ is different from the depth of the inlet ports 30 $P_d$ provided to the swirl chamber 31. The depth of the swirl chamber 31 may be the same as the depths of the inlet ports 30. The outlet orifice 22 has a diameter $d_o$ and a land length $l_o$, which extends from the swirl chamber 31 to the final outlet of nozzle insert 21.

The inlet ports 30 leading to the swirl chamber 31 may be substantially rectangular in shape. The inlet ports 30 have a width ($P_w$) and depth ($P_d$). As noted above, that the number of inlet ports 30 provided to the swirl chamber 31 can be varied. Along these lines, the shape and angle of the inlet ports 30 with respect to the swirl chamber 31 can also be varied.

The particular type of gas that is used as the propellant in systems according to the disclosure can be selected based on convenience, cost, properties of the corresponding container, and properties of the liquid product formulation. For example, a propellant may be selected to be soluble in a liquid product formulation. Examples of compressed gases that can be used in systems according to the disclosure include air, argon, nitrogen, nitrous oxide, inert gases, and carbon dioxide. Examples of liquefied compressed gas propellants include propane, isobutane, n-butane, isopentane, n-pentane, and dimethyl ether. The propellent may be selected from carbon dioxide, nitrogen, or mixtures thereof. The propellent may be non-flammable. Along with the particular type of gas, the amount of headspace provided by the gas can be adjusted or tailored as desired. Because compressed gases do not significantly dissolve in the liquid portion of a compressed gas product, the amount of headspace is primarily a function of the amount of compressed gas used in the container. A headspace of about 30% to about 40% may be used. Alternatively, the headspace may be less than about 30% or greater than about 40%.

The container for use in systems of the disclosure may be a metallic container, such as a steel or aluminum canister, or combinations thereof. Alternatively, the container could be manufactured using a plastic. "Plastic" refers to any synthetic or organic material that can be molded or shaped, generally when heated, and then hardened into a desired form including, but not limited to, polymer, resin; and cellulose derivative.

The plastic may be polymeric and may be partially, substantially, or entirely comprised of polyester; polyethyleneterephthalate ("PET"); polyethylene napthalate, polyethylene furanoate, polyamide; nylon 6/6, nylon 66, nylon 11, polycarbonate; polyoxymethylene; polyacrylonitrile; polyolefin; polyethylene, polypropylene, fluoropolymer; polybutylene succinate); recycled, and regrind versions of the other polymer materials; bio-based and petroleum-based versions of the other polymer materials; and mixtures thereof. The plastic container may comprise multiple layers of other polymer materials. By polymeric it is meant that the component is formed of a material which is plastic, comprises polymers, and/or particularly polyolefin, polyester, or nylons. Thus, the entire plastic container or certain components thereof may be free of metal.

The container may be selected for use with a particular compressed gas formulation. As will be appreciated by those skilled in the art, containers used to provide compressed gas products are required by law to be made in accordance with Department of Transportation (DOT) and Interstate Commerce Commission (ICC) regulations. These regulations mandate certain dimensional, material, manufacture, wall thickness, and testing requirements for a container to be charged to a given pressure. For example, a 2P rated container can be used if the internal pressure is from 140 psig to 160 psig at 130° F. and a 2Q rated container can be used if the internal pressure is from 161 psig to 180 psig at 130° F. The containers used in accordance with the present disclosure may be adjusted to meet these regulations, and as such, be used to provide a compressed gas product at any given pressure in the container. The products of the disclosure may be specifically designed as 2Q and 2P rated containers.

Other properties of the compressed gas products, including viscosity, density, and surface tension, may also be adjusted to achieve desired effects. The density of the compressed gas product may be about 1.00 g/cm3, the surface tension may be about 30 mN/m, and the viscosity may be about 1.0-1.6 cP.

Arthropod Pest Control Composition

The arthropod pest control composition may comprise at least one carrier oil. The carrier oil may be a hydrocarbon oil, such as a hydrocarbon oil derived from petroleum, animal, or plant sources. An example of a suitable petroleum-derived oil is mineral oil. An example of a suitable animal-derived oil includes fish oil. Examples of suitable plant-derived oils include corn oil, soybean oil, palm oil, rapeseed oil, sesame oil, wheat oil, wheat germ oil, coconut oil, canola oil, sunflower oil, safflower oil, peanut oil, olive oil, and castor oil. The hydrocarbon oil may be paraffinic, naphthenic and/or aromatic.

The arthropod pest control composition may comprise a single carrier oil or a mixture of carrier oils. The arthropod pest control composition may comprise greater than about 25 percent by weight of a carrier oil, or from about 30% by weight to about 99.5% by weight of a carrier oil, or from about 50% by weight to about 98% by weight of a carrier oil, or from about 80% by weight to about 95% by weight of a carrier oil or from about 85% by weight to about 95% by weight of a carrier oil.

The carrier oil may have a specific gravity from about 0.73 to about 0.96 or from about 0.76 to about 0.93 or from about 0.78 to about 0.89 or from about 0.79 to about 0.84 or from about 0.8 to about 0.82 as measured according to ASTM D-4052 measured at 15° C. The carrier oil may have a viscosity from about 3 cSt to about 120 cSt, or from about 4 cSt to about 50 cSt, or form about 5 cSt to about 25 cSt as measured according to ASTM D-7042 at 40° C. The carrier oil may have a flash point from about 60° C. to about 170° C. or from about 80° C. to about 140° C. or from about 100° C. to about 125° C. as measured according to ASTM D-93.

The arthropod pest control composition may comprise one or more propellants, as described above. Propellants pressurize the formulation within the container to propel the formulation through the nozzle and out of the container.

The arthropod pest control composition may comprise one or more active ingredients (also referred to herein as actives) selected from the group consisting of essential plant oils (including synthetic analogues), eugenol, 2-phenylethyl propionate, amyl butyrate, geraniol, esters, such as isopropyl myristate, fatty acids and salts thereof, d-limonene, linalool, methyl salicylate, alpha-pinene, piperonal, piperonyl alcohol, tetrahydrolinalool, thymol, vanillin, ethyl vanillin, iso-eugenol, ethyl cinnamate, pyrethrins, abamectin, azadirachtin, amitraz, rotenone, boric acid, spinosad, biopesticides, synthetic pesticides, and mixtures thereof. The arthropod pest control composition may comprise from about 0.1% by weight to about 30% by weight, or from about 0.5% by weight to about 20% by weight, or from about 1% to about 10% by weight, or from about 1% by weight to about 5% by weight of one or more actives.

The arthropod pest control composition may comprise one or more essential plant oils. Nonlimiting examples of essential plant oils include aldehyde C16 (pure), almond oil, alpha-terpineol, amyl cinnamic aldehyde, amyl salicylate, anisic aldehyde, benzyl alcohol, benzyl acetate, cinnamaldehyde, cinnamic alcohol, carvacrol, carveol, citral, citronellal, citronellol, dimethyl salicylate, eucalyptol (cineole), eugenol, iso-eugenol, galaxolide, geraniol, guaiacol, ionone, menthol, methyl anthranilate, methyl ionone, methyl salicylate, nerol, alpha-phellandrene, pennyroyal oil, perillaldehyde, 1- or 2-phenyl ethyl alcohol, 1- or 2-phenyl ethyl propionate, piperonal, piperonyl acetate, piperonyl alcohol, D-pulegone, terpinen-4-ol, terpinyl acetate, 4-tert butylcyclohexyl acetate, thyme oil, thyme oil white, thyme oil red, thymol, trans-anethole, vanillin, ethyl vanillin, castor oil, cedar oil, cedarwood oil, cinnamon, cinnamon oil, citronella, citronella oil, clove, clove oil, corn oil, cornmint oil, cottonseed oil, garlic, garlic oil, geranium oil, lemongrass oil, linseed oil, mint, mint oil, peppermint, peppermint oil, spearmint, spearmint oil, rosemary, rosemary oil, sesame, sesame oil, soybean oil, white pepper, licorice oil, wintergreen oil, star anise oil, lilac flower oil, black seed oil, grapefruit seed oil, grapefruit, lemon oil, orange oil, tea tree oil, *Tagete minuta* oil, lavender oil, *Lippia javancia* oil, oil of bergamot, *galbanum* oil, lovage oil, and mixtures thereof. The arthropod pest control composition may comprise from about 0.1% by weight to about 30% by weight, or from about 0.5% by weight to about 20% by weight, or from about 1% to about 10% by weight of one or more essential plant oils.

The arthropod pest control composition may comprise one or more synthetic pesticides. Nonlimiting examples of synthetic pesticides include pyrethroids, such as bifenthrin, esfenvalerate, fenpropathrin, permethrin, cypermethrin, cyfluthrin, deltamethrin, allethrin, lambda-cyhalothrin, or the like; syngergists, such as piperonyl butoxide, or the like; juvenile hormone analogues, such as methoprene, hydroprene, kinoprene, or the like; and neonicotinoids, such as imidacloprid, acetamiprid, thiamethoxam, or the like, and mixtures thereof. The arthropod pest control composition may comprise less than about 10%, or less than about 5%, or less than about 2%, or less than about 1%, or less than about 0.5%, or less than about 0.1% by weight synthetic pesticide.

The arthropod pest control composition may comprise one or more biopesticides. Nonlimiting examples of biopesticides include pyrethrum, rotenone, neem oil, and mixtures thereof.

The arthropod pest control composition may comprise one or more fatty acids or fatty acid salts. Fatty acids are organic molecules comprising a single carboxylic acid moiety and at least 7 carbon atoms, or from about 11 to about 22 carbon atoms, or from about 12 to about 16 carbon atoms. Fatty acids and the salts thereof may be linear, branched, saturated, unsaturated, cyclic, or mixtures thereof. Nonlimiting examples of fatty acids and fatty acid salts include lauric acid, myristic acid, palmitic acid, stearic acid, arachidic acid, behenic acid, lignoceric acid, myristoleic acid, palmitoleic acid, sapienic acid, oleic acid, elaidic acid, vaccenic acid, linoleic acid, linoelaidic acid, arachidonic acid, eicosapentaenoic acid, erucic acid, docosahexaenoic acid, the sodium, calcium, potassium or zinc salts thereof, or mixtures thereof. The pest control composition may comprise from about 0.1% by weight to about 60% by weight, or from about 1% by weight to about 40% by weight, or from about 2% to about 20% by weight of one or more fatty acids or fatty acid salts.

The arthropod pest control composition may comprise one or more esters. Esters are commonly formed by reacting a carboxylic acid with a molecule comprising one or more hydroxyl groups. Examples of suitable carboxylic acids include acetic acid, formic acid, lactic acid, citric acid, malic acid, oxalic acid, propanoic acid, propiolic acid, butyric acid, isobutryic acid, caproic acid, adipic acid, benzoic acid, salicylic acid, caprylic acid and fatty acids. Nonlimiting examples of molecules comprising one or more hydroxyl groups include methanol, ethanol, propyl alcohol, isopropyl alcohol, butyl alcohol, sec-butyl alcohol, isobutyl alcohol, tert-butyl alcohol, ethylene glycol, propylene glycol, glycerol, polyglycerol, cyclohexanol, and benzyl alcohol. Examples of suitable esters include isopropyl myristate, butyl lactate, ethyl lactate, butyl stearate, triethyl citrate, glycerol monooleate, glyceryl dicaprylate, glyceryl dimyristate, glyceryl dioleate, glyceryl distearate, glyceryl monomyristate, glyceryl monooctanoate, glyceryl monooleate, glyceryl monostearate, glyceryl stearate, diglyceryl monooleate, and diglyceryl monostearate. The pest control composition may comprise from about 0.1% by weight to about 60% by weight, or from about 1% by weight to about 40% by weight, or from about 2% to about 20% by weight, or from about 2% by weight to about 10% by weight, or from about 1% by weight to about 5% by weight of one or more esters.

The arthropod pest control composition may comprise an ester selected from isopropyl myristate, isopropyl palmitate, isopropyl isothermal, putty stearate, isostearyl neopentonate, myristyl myristate, decyl oleate, octyl sterate, octyl palmitate, isocetyl stearate, or PPG myristyl propionate, or mixture thereof. The arthropod pest control composition may comprise isopropyl myristate, which is the ester of isopropanol and myristic acid. Isopropyl myristate is also known as 1-tetradecanoic acid, methylethyl ester, myristic acid isopropyl ester, and propan-2-yl tetradecanoate.

The arthropod pest control composition may comprise less than about 10%, or less than about 5% by weight, or less than about 2% by weight, or less than about 1% by weight, or less than about 0.5% by weight, or less than about 0.1% by weight water.

The arthropod pest control composition may comprise one or more surface-active agents. Surface-active agents may reduce the surface tension of the arthropod pest control composition. Nonlimiting examples of surface-active agents include lecithin, sodium lauryl sulfate, sodium laureth sulfate, fatty acids, fatty acid salts, glyceryl esters, and triethyl citrate. The arthropod pest control composition may comprise from about 0.1% by weight to about 30% by weight, or from about 0.5% by weight to about 20% by weight, or from about 1% by weight to about 10% by weight, or from about 1% by weight to about 5% by weight of a surface-active agent.

The arthropod pest control composition may comprise one or more alcohols. The alcohol may be a monohydridic or polyhydridic alcohol. Nonlimiting examples of alcohols include ethanol, propanol, isopropyl alcohol, butyl alcohol, heptanol, octanol, decanol, lauryl alcohol, myristic alcohol, cetyl alcohol, palmitoleyl alcohol, stearyl alcohol, and oleyl alcohol. The pest control composition may comprise from about 0.1% by weight to about 40% by weight, or from about 0.5% by weight to about 20% by weight, or from about 1% by weight to about 10% by weight, or from about 1% by weight to about 5% by weight of an alcohol.

The neat arthropod pest control composition (i.e. composition without propellant), may have a specific density from about 0.75 to about 0.95, or from about 0.78 to about 0.92, or from about 0.79 to about 0.90, or from about 0.8 to about 0.88, or from about 0.82 to about 0.86, as measured according to ASTM D-4052 at 25° C. and atmospheric pressure. The arthropod pest control composition may have a viscosity from about 3 cSt to about 120 cSt, or from about 4 cSt to about 50 cSt, or form about 5 cSt to about 25 cSt, as measured according to ASTM D-7042 at 40° C. and atmospheric pressure. The arthropod pest control composition may have a flash point from about 20° C. to about 150° C., from about 22° C. to about 75° C., from about 24° C. to about 60° C. or from about 28° C. to about 45° C. as measured according to ASTM D-93 at atmospheric pressure.

Test Methods

Spray Droplet Size Test Method

The term "Dv10 value" describes the average particle size where 10 vol. % of the particles have a smaller size. Similarly, the term "Dv50 value" describes the average particle size where 50 vol. % of the particles have a smaller size, and the term "Dv90 value" describes the average particle size where 90 vol. % of the particles have a smaller size. The Sauter mean diameter (D[3, 2]) is the weighted average surface diameter, assuming spherical particles of the same surface area as the actual particles:

$$D[3, 2] = \frac{\sum D_1^3 n_i}{\sum D_1^2 n_i}.$$

Spray droplet volume size distribution measurements comprising Spray D(50) Normalized, Spray D(90) Normalized, and Spray D(2,3) Normalized values are determined using a Malvern Spraytec 2000 laser diffraction spray droplet sizing instrument (supplied by Malvern Instruments, Worcestershire, UK), equipped with a 300 mm lens possessing a focal length of the 150 mm, and an Air Purge System (not greater than 14.5 psi). The system is controlled with a computer and software accompanying the instrument, such as the Spraytec software version 3.20 or equivalent, utilizing Mie Theory and Fraunhofer Approximation optical theory. The system is placed in a fume hood for atmospheric control with care taken to place it directly opposite the actuation spray plume trajectory to prevent saturation, with an air flow rate of between 50-70 L/min (60 L/min was the target rate). The distance from the dispensing nozzle orifice to the laser during measurements is 30 cm. A new spray bottle is used for each sample replicate analyzed. Lighting conditions are not changed during or between the background control and test sample data collection periods. Light obscuration values below 95% are considered suitable to provide accurate results.

Samples analyzed included "example" samples, which are samples according to this disclosure, and comparative samples. All newly created example samples are tested within three hours of preparation and are measured at temperatures between 20-22° C. Deionized water is used as a standard reference spray and is labeled as the "control."

Spray measurements are conducted using the following spray SOP instrument configuration: Rapid SOP type is chosen, and the following settings are selected: Hardware Configuration is set to "Default", Measurement Type is set to "Rapid", Data Acquisition Rate is set to "250 Hz", and Lens Type is set to "300". Within the Measurement menu: Background is set to "3 seconds", Inspection is selected, the box under Output Trigger is Unchecked. Under the Measurement tab "Rapid" is selected, Events Number is set to "1", Duration Per Event is set to "4000.0", Units is set to "ms". Measurement Trigger where Trigger Type is set to "Transmission drops to level" and Transmission is set to "96", Data Collection where Start is set to "52", Units is set to "ms", and select "before the trigger" from the drop down menu. On the Advanced tab window, all boxes are Unchecked, and Grouping is "no grouping"; The Background Alarms are set to "default values". On the Analysis Tab and under Optical Properties, Particle Set is set to "Water", Dispersant set to "Air", Multiple Scattering Analysis is set to "Enable". On the Data Handling tab and under Detector Range is set to "first: 1 and last: last", "No extinction analysis" box is selected, Scattering threshold is set to "1". On the Data Handling/Spray Profile the Path Length is set to "100.0", the Alarm is selected, and the "Use default values" box is checked. On the Additional Properties tab the Curve Fit is set to "no fit", User Size is set to "enable box", the drop down menu is set to "Default". On the Additional Properties/Advanced tab Particle Diameter is set to "0.10" for the minimum and to "900" for the maximum, and Result Type is set to "Volume Distribution". On the Output tab, Export Option is set to "not selected", the Derived Parameter is selected, the Use Averaging Period box is selected and set to "0.0" and "ms". On the Average menu "Average scatter data" is selected.

Spray measurements are conducted using the following Spray Procedure: The sample is first test sprayed from the spray bottle for 1-2 seconds, to ensure that the nozzle is free flowing and not clogged; the sample is loaded into the holding device in the front of the Spraytec 2000 system. The actuator is fully depressed. The spray droplet size data are viewed and saved as "Average Scatter Data".

a. The value obtained from each sample measurement is normalized to the control sample value in accordance with the following calculations:

The value of Spray $D(50)$ Normalized= $D(50)_{Example}/D(50)_{Control}$;

The value of Spray $D(90)$ Normalized= $D(90)_{Example}/D(90)_{Control}$;

The value of Spray $D(3,2)$ Normalized= $D(3,2)_{Example}/D(3,2)_{Control}$;

wherein:

$D(50)$, $D(90)$, and $D(3,2)$ are values obtained from the instrument software for both the example samples and control samples separately.

Each of the Spray $D(90)$ Normalized and Spray $D(3,2)$ Normalized values reported for each of the samples is the average value calculated from five replicate spray plumes per sample.

Laser Sheet Imaging Method

The spray patterns of several aerosol arthropod pest control products are imaged by laser sheet imaging (LSI) using a LaVision SprayMaster system. This system is designed for the quantitative visualization of the spray process. The integrated imaging system uses a laser sheet to measure the intensity of the spray plume. Laser light sheets slice through the spray plume with high temporal and spatial resolution. This method determines the spray concentration distribution and provides information on the size, shape, and relative distribution of the spray plume, providing two-dimensional spray concentration distribution results.

EXAMPLES

The spray patterns, flow rates, dose delivered to a circle with a 4 inch diameter from 12 inches away, and particle sizes of several aerosol arthropod pest control products are measured. Nozzle inserts of varying geometries, such as orifice diameter, orifice land length, swirl chamber diameter, swirl chamber depth, inlet port width, and inlet port depth, are tested. The nozzle geometries are shown in Table 1, using the same abbreviations as in the figures, which are described above. Specifically, the diameter of the outlet orifice is labeled $d_o$, the diameter of the swirl chamber is labeled $D_s$, the land length of the outlet orifice is labeled $l_o$, the depth of the swirl chamber is labeled $S_d$. The values are given in millimeters. Table 1 further indicates the number of inlet ports leading to the swirl chamber of each insert.

The discharge flow rates indicated in Table 2 are determined by discharging the dispenser for 10 seconds. The flow rate is measured using a stopwatch and a scale made by Mettler-Toledo of Columbus, Ohio. Other parameters of the products, such as the size of the containers, the initial pressure in the containers, are the same for all of the products. Additionally, all of the tests are conducted at ambient temperature (about 70° F.).

Examples of arthropod pest control products are evaluated for aerosol spray characteristics. Arthropod pest control composition A may include, in weight percentages based on total weight of the composition and propellant: 30-60% mineral oil; 1-5% carbon dioxide; 6% geraniol; 30-60% isopropyl myristate; 0.5% lemongrass; and 10-30% ethyl (L)-lactate. The additional arthropod pest control compositions may include, in weight percentages based on total weight of the composition and propellant: 75-95% mineral oil; 1-5% 2-propanol; 2-10% lactic acid, N-butyl ester, and/or ethyl (L)-lactate; and 1-5% carbon dioxide; 1-5% geraniol, cinnamon oil, lemongrass oil, vanillin, triethyl citrate, and/or isopropyl myristate.

TABLE 1

Spray Nozzles for Examples A-G.

| EXAMPLE | A | B | C | D | E | F | G |
|---|---|---|---|---|---|---|---|
| Orifice Diameter ($d_0$) | 0.69 mm | 0.45 mm | 0.38 mm | 0.38 mm | 0.38 mm | 0.41 mm | 0.38 mm |
| Orifice Land Length ($l_0$) | 0.63 mm | 0.30 mm | 0.60 mm | 0.89 mm | 0.89 mm | 0.42 mm | 0.89 mm |
| Swirl Chamber Diameter ($D_S$) | N/A | 0.95 mm | 1.60 mm | 1.70 mm | 1.00 mm | 1.55 mm | 1.10 mm |
| Swirl Chamber Depth ($S_d$) | N/A | 0.22 mm | 0.80 mm | 0.95 mm | 0.89 mm | 1.08 mm | 1.21 mm |
| Inlet Port Width ($P_w$) | N/A | 0.20 mm | 0.45 mm | 0.45 mm | 0.46 mm | 0.39 mm | 0.54 mm |
| Inlet Port Depth ($P_d$) | N/A | 0.22 mm | 0.48 mm | 0.48 mm | 0.48 mm | 0.49 mm | 0.66 mm |
| Number of Inlet Ports | N/A | 6 | 3 | 3 | 3 | 4 | 3 |

The aerosol test samples A-G are Raid Ant & Roach Killer27 (A), Zevo Ant, Roach & Spider Crawling Insect Spray (B), and Zevo Ant, Roach & Spider Crawling Insect Spray where the actuator is removed and replaced with actuators having the nozzle configurations of Examples C, D, E, F, and G above.

Test samples are spray tested using a Malvern analyzer to obtain the Sauter mean diameter (SMD), defined as the ratio of the volume diameter and the surface area diameter, and the mass median diameter (MMD) for a particle diameter wherein 50% and 90% of the volume sampled is below the measured particle diameter. All test samples are sprayed at full can following a 10 second spray.

TABLE 2

Performance of Examples A-G

| EXAMPLE | A | B | C | D | E | F | G |
|---|---|---|---|---|---|---|---|
| Total Discharge Flow Rate[1] | 2.16 g/s | 2.51 g/s | 2.43 g/s | Not Tested | 2.35 g/s | 2.50 g/s | 2.66 g/s |
| Dose within 4" dia. @ 12 in. distance[2] | 1.90 g. | 0.93 g. | 1.66 g. | Not Tested | 1.69 g. | 1.35 g. | 2.38 g. |
| Dose outside 4" dia. @ 12 in. distance[3] | 0.26 g. | 1.58 g. | 0.77 g. | Not Tested | 0.66 g. | 1.15 g. | 0.28 g. |
| $D_v$ (50) μM | 248.7 | 109.7 | 119.4 | Not Tested | 105.7 | 99.8 | 137.6 |
| $D_v$ (90) μM | 557.3 | 197.8 | 217.4 | Not Tested | 192.8 | 157.2 | 282.8 |
| D(3,2) μm | 197.9 | 89.47 | 97.17 | Not Tested | 85.15 | 93.8 | 107.7 |

[1] 10 replicates are measured over five consecutive point of can fullness, using the same, new can.
[2] 5 replicates are measured over five consecutive points of can fullness, using the same, new can.
[3] 5 replicates are measured over five consecutive points of can fullness, using the same new can.

TABLE 3

Particle Size change with can volume

| G | 90% Full | 50% Full | 10% Full |
|---|---|---|---|
| $D_v$ (50)μm | 137.6 | 151.9 | 178.8 |
| $D_v$ (90)μm | 282.8 | 300.4 | 345.7 |
| D(3.2)μm | 107.7 | 117.4 | 141.9 |

The results in Table 3 show the particle sizes across different can volumes. The particle sizes increase at lower can volumes.

Two-dimensional images of a spray plume in a plan parallel to and 12 inches away from a nozzle outlet are shown in FIG. 7. The intensity gradient for each image is normalized to a scale from zero to one using the maximum intensity for each image. The two-dimensional images for three aerosol arthropod pest control products according to the disclosure 7A-7F, as well as comparative products, 7G-7I, are shown FIG. 7. The images in FIG. 7A-7I show that the aerosol arthropod pest control products of the disclosure provide a more targeted spray that more covers the target area more evenly without spraying outside the target area.

Combinations

A. An aerosol arthropod pest control product comprising an aerosol dispenser assembly and an arthropod pest control composition, wherein the aerosol dispenser assembly comprises a reservoir, a valve assembly in fluid communication with the reservoir, an actuator body, and a nozzle insert comprising a swirl chamber in fluid communication with a plurality of inlet ports and an outlet orifice; wherein the arthropod pest control composition comprises from about 5% to about 99% by weight of a carrier oil, from about 0.1% to about 25% by weight of one or more active ingredients, and a propellant; and wherein the aerosol arthropod pest control product has a flow rate of about 1.80 g/s to about 3.00 g/s and a Dv50 value of about 100 μm to about 200 μm.

B. An aerosol arthropod pest control product comprising an aerosol dispenser assembly and an arthropod pest control composition, wherein the aerosol dispenser assembly comprises a reservoir, a valve assembly in fluid communication with the reservoir, an actuator body, and a nozzle insert comprising a swirl chamber in fluid communication with a plurality of inlet ports and an outlet orifice; wherein the arthropod pest control composition comprises from about 5% to about 99% by weight of a carrier oil, from about 0.1% to about 25% by weight of one or more active ingredients, and a propellant; and wherein the aerosol arthropod pest control product has a flow rate of about 1.80 g/s to about 3.00 g/s and a Sauter mean diameter of about 85 μm to about 156 μm.

C. A method of controlling an arthropod pest comprising:
a) providing an aerosol arthropod pest control product comprising an arthropod pest control composition contained within a reservoir of an aerosol dispenser assembly;
b) dispensing the arthropod pest control composition from the aerosol dispenser assembly through a nozzle insert comprising a swirl chamber;
wherein the arthropod pest control composition comprises from about 5% to about 99% of a carrier oil and from about 0.1% to about 25% of one or more active ingredients; and wherein the aerosol arthropod pest control product has a flow rate of about 1.80 g/s to about 3.00 g/s and a Dv50 value of about 100 μm to about 200 μm.

D. The product of paragraph A or the method of paragraph C, wherein the aerosol arthropod pest control product has a Sauter mean diameter of about 85 μm to about 156 μm.

E. The product of paragraph B, wherein the aerosol arthropod pest control product has a Dv50 value of about 100 μm to about 200 μm.

F. The product or method of any one of the preceding paragraphs, wherein the carrier oil is a hydrocarbon oil.

G. The product or method of any one of the preceding paragraphs, wherein the aerosol arthropod pest control product has a Dv90 value of about 180 μm to about 450 μm.

H. The product or method of any one of the preceding paragraphs, wherein the dose of aerosol arthropod pest control composition sprayed from the aerosol pest control product from a 12" distance and delivered within a 4" diameter, as measured according to the Dose to 4" dia. @ 12 in. distance Method described herein, is about 1.00 g to about 2.00 g.

The product or method of any one of the preceding paragraphs, wherein the dose of aerosol arthropod pest control composition sprayed from the aerosol pest control product from a 12" distance and delivered outside a 4" diameter, as measured according to the Dose to 4" dia. @ 12 in. distance Method described herein, is about 0.50 g to about 1.10 g.

J. The product or method of any one of the preceding paragraphs, wherein the ratio of the dose of aerosol arthropod pest control composition sprayed from the aerosol pest control product from a 12" distance and delivered within a 4" diameter to the dose sprayed from a 12" distance and delivered outside a 4" diameter, as measured according to the Dose to 4" dia. @ 12 in. distance Method described herein, is from about 3:2 to about 10:1.

K. The product or method of any one of the preceding paragraphs, wherein the diameter of the outlet orifice is about 0.36 mm to about 0.40 mm.

L. The product or method of any one of the preceding paragraphs, wherein the land length of the outlet orifice is about 0.60 mm to about 0.89 mm.

J. The product or method of any one of the preceding paragraphs, wherein the diameter of the swirl chamber is about 1.00 mm to about 1.70 mm.

K. The product or method of any one of the preceding paragraphs, wherein the depth of the swirl chamber is about 0.80 mm to about 1.40 mm.

L. The product or method of any one of the preceding paragraphs, wherein the width of each inlet channel is about 0.42 mm to about 0.62 mm.

M. The product or method of any one of the preceding paragraphs, wherein the depth of each inlet channel of about 0.45 mm to about 0.70 mm.

N. The product or method of any one of the preceding paragraphs, wherein the arthropod pest control composition comprises mineral oil.

O. The product or method of any one of the preceding paragraphs, wherein the arthropod pest control composition comprises from about 10% to about 99% by weight mineral oil.

P. The product or method of any one of the preceding paragraphs, wherein the arthropod pest control composition comprises from about 0.1% to about 20% by weight of one or more active ingredients.

Q. The product or method of any one of the preceding paragraphs, wherein the one or more active ingredients is selected from the group consisting of essential plant oil, eugenol, 2-phenylethyl propionate, amyl butyrate, geraniol, esters, such as isopropyl myristate, fatty acids and salts thereof, d-limonene, linalool, methyl salicylate, alpha-pinene, piperonal, piperonyl alcohol, tetrahydrolinalool, thymol, vanillin, ethyl vanillin, iso-eugenol, ethyl cinnamate, pyrethrins, abamectin, azadirachtin, amitraz, rotenone, boric acid, spinosad, biopesticides, synthetic pesticides, and mixtures thereof.

R. The product or method of any one of the preceding paragraphs, wherein the arthropod pest control composition comprises 0.01% to about 30%, preferably 0.01% to about 20% by weight isopropyl myristate.

S. The product or method of any one of the preceding paragraphs, wherein the arthropod pest control composition comprises 0.01% to about 30% by weight triethyl citrate.

T. The product or method of any one of the preceding paragraphs, wherein the propellant is selected from the group consisting of carbon dioxide, nitrogen, and air.

U. The method of paragraph C, wherein the swirl chamber is in fluid communication with a plurality of inlet ports and an outlet orifice.

V. The method of paragraph C, wherein the aerosol dispenser assembly comprises a valve assembly in fluid communication with a reservoir and an actuator body for the valve assembly.

X. The method of paragraph C, wherein the arthropod pest control composition comprises a propellant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aerosol arthropod pest control product comprising an aerosol dispenser assembly and an arthropod pest control composition, wherein the aerosol dispenser assembly comprises a reservoir, a valve assembly in fluid communication with the reservoir, an actuator body, and a nozzle insert comprising a swirl chamber in fluid communication with a plurality of inlet ports and an outlet orifice; wherein the arthropod pest control composition comprises from about 5% to about 99% by weight of a carrier oil, from about 0.1% to about 25% by weight of one or more active ingredients, and a propellant; and wherein the aerosol arthropod pest control product has a flow rate of about 1.80 g/s to about 3.00 g/s and a Dv50 value of about 100 µm to about 200 µm.

2. An aerosol arthropod pest control product comprising an aerosol dispenser assembly and an arthropod pest control composition, wherein the aerosol dispenser assembly comprises a reservoir, a valve assembly in fluid communication with the reservoir, an actuator body, and a nozzle insert comprising a swirl chamber in fluid communication with a plurality of inlet ports and an outlet orifice; wherein the arthropod pest control composition comprises from about 5% to about 99% by weight of a carrier oil, from about 0.1% to about 25% by weight of one or more active ingredients, and a propellant; and wherein the aerosol arthropod pest control product has a flow rate of about 1.80 g/s to about 3.00 g/s and a Sauter mean diameter of about 85 µm to about 156 µm.

3. The aerosol arthropod pest control product of claim 2, wherein the aerosol arthropod pest control product has a Dv50 value of about 100 µm to about 200 µm.

4. The aerosol arthropod pest control product of claim 1, wherein the carrier oil is a hydrocarbon oil.

5. The aerosol arthropod pest control product of claim 1, wherein the aerosol arthropod pest control product has a Dv90 value of about 180 µm to about 450 µm.

6. The aerosol arthropod pest control product of claim 1, wherein the dose of aerosol arthropod pest control composition sprayed from the aerosol pest control product from a 12" distance and delivered within a 4" diameter, as measured according to the Dose to 4" dia. @ 12 in. distance Method described herein, is about 1.00 g to about 2.00 g.

7. The aerosol arthropod pest control product of claim 1, wherein the dose of aerosol arthropod pest control composition sprayed from the aerosol pest control product from a 12" distance and delivered outside a 4" diameter, as measured according to the Dose to 4" dia. @ 12 in. distance Method described herein, is about 0.50 g to about 1.10 g.

8. The aerosol arthropod pest control product of claim 1, wherein the ratio of the dose of aerosol arthropod pest control composition sprayed from the aerosol pest control product from a 12" distance and delivered within a 4" diameter to the dose sprayed from a 12" distance and delivered outside a 4" diameter, as measured according to the Dose to 4" dia. @ 12 in. distance Method described herein, is from about 3:2 to about 10:1.

9. The aerosol arthropod pest control product of claim 1, wherein the diameter of the outlet orifice is about 0.36 mm to about 0.40 mm, the land length of the outlet orifice is about 0.60 mm to about 0.89 mm, the diameter of the swirl chamber is about 1.00 mm to about 1.70 mm, the depth of the swirl chamber is about 0.80 mm to about 1.40 mm, the width of each inlet channel is about 0.42 mm to about 0.62 mm, and/or the depth of each inlet channel is about 0.45 mm to about 0.70 mm.

10. The aerosol arthropod pest control product of claim 1, wherein the arthropod pest control composition comprises mineral oil.

11. The aerosol arthropod pest control product of claim 10, wherein the arthropod pest control composition comprises from about 10% to about 99% by weight mineral oil.

12. The aerosol arthropod pest control product of claim 1, wherein the arthropod pest control composition comprises from about 0.1% to about 20% by weight of one or more active ingredients selected from the group consisting of essential plant oil, eugenol, 2-phenylethyl propionate, amyl butyrate, geraniol, esters, fatty acids and salts thereof, d-limonene, linalool, methyl salicylate, alpha-pinene, piperonal, piperonyl alcohol, tetrahydrolinalool, thymol, vanillin, ethyl vanillin, iso-eugenol, ethyl cinnamate, pyrethrins, abamectin, azadirachtin, amitraz, rotenone, boric acid, spinosad, biopesticides, synthetic pesticides, and mixtures thereof.

13. The aerosol arthropod pest control product of claim 1, wherein the arthropod pest control composition comprises from about 0.01% to about 30% by weight isopropyl myristate.

14. The aerosol arthropod pest control product of claim 1, wherein the arthropod pest control composition comprises from about 0.01% to about 30% by weight triethyl citrate.

15. The aerosol arthropod pest control product of claim 1, wherein the propellant is selected from the group consisting of carbon dioxide, nitrogen, and air.

* * * * *